United States Patent [19]
Lee et al.

[11] Patent Number: 6,156,116
[45] Date of Patent: Dec. 5, 2000

[54] CONVERSION OF CRUDE PHTHALOCYANINE BLUE FROM RED TO GREEN SHADE IN AN AQUEOUS ENVIRONMENT

[75] Inventors: Frank Jin Lee, Bridgewater, N.J.; Kevin Richard Stank, Whitehall, Pa.

[73] Assignee: Air Products and Chemicals, Inc., Allentown, Pa.

[21] Appl. No.: 09/272,444

[22] Filed: Mar. 19, 1999

[51] Int. Cl.[7] .............................. C09B 47/04; C09B 47/30
[52] U.S. Cl. .......................... 106/412; 106/410; 106/411; 106/413; 540/122
[58] Field of Search ...................................... 106/410, 411, 106/412, 413; 540/122

[56] References Cited

U.S. PATENT DOCUMENTS

| | | | |
|---|---|---|---|
| 2,816,115 | 12/1957 | Howell | 540/122 |
| 3,593,927 | 7/1971 | Neill | 241/16 |
| 4,158,572 | 6/1979 | Blackburn | 106/412 |
| 4,427,810 | 1/1984 | Chisvette et al. | 524/88 |
| 4,694,078 | 9/1987 | Langley et al. | 540/141 |
| 4,801,634 | 1/1989 | Langley et al. | 524/88 |
| 4,801,638 | 1/1989 | Langley et al. | 524/88 |
| 4,981,888 | 1/1991 | Langley et al. | 524/88 |

FOREIGN PATENT DOCUMENTS

| | | |
|---|---|---|
| 2039290 | 2/1983 | United Kingdom . |

*Primary Examiner*—Anthony Green
*Attorney, Agent, or Firm*—Michael Leach

[57] ABSTRACT

A method for converting crude phthalocyanine blue from red to green by milling a dispersion of the crude phthalocyanine and an aqueous medium containing a particulate grinding aid and a surfactant grinding aid composition characterized by employing a surfactant grinding aid composition comprising an acetylenic diol surfactant of the general formulas I and II:

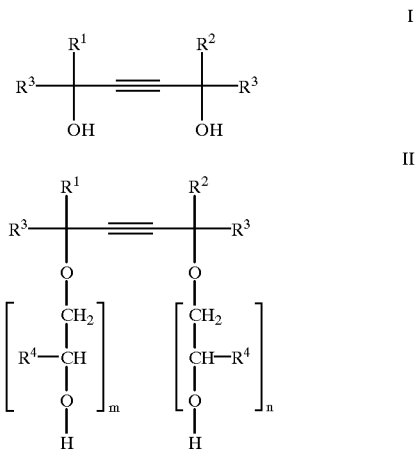

where $R^1$ and $R^2$, which may be the same or different, are C1–C8 alkyl, $R^3$ is hydrogen or methyl, $R^4$ is hydrogen, methyl, ethyl, or any combination thereof, and m+n=an average value from 1 to 100.

22 Claims, No Drawings

CONVERSION OF CRUDE PHTHALOCYANINE BLUE FROM RED TO GREEN SHADE IN AN AQUEOUS ENVIRONMENT

TECHNICAL FIELD

The present invention relates to a process for transforming crude phthalocyanine blue in an aqueous composition into a pigmentary state using a surfactant grinding aid.

BACKGROUND OF THE INVENTION

Organic pigments are, in general, obtained from their synthesis in a physical state which is unsuitable for use. These crude pigments have, for example, a coarse particle size, a non-uniform or unsuitable crystal shape, or an excessive aggregation tendency. Crude pigments are therefore comminuted, and the residues of starting materials, undesirable by-products and the like are removed. The powders as obtained, however, have poor coloristic properties on account of a broad particle-sized spectrum.

Phthalocyanine pigment has been used as a color source in many industries including inks, coatings, plastics and textiles. In many cases, the desired shade or hue of the phthalocyanine pigment is that of the green (β crystal) shade. As synthesized crude phthalocyanine of the β form is blue, but, due to its large particle size, poor color strength and an inherent dirty red shade, it is typically processed further to the more desired green shade via milling, or grinding, with salts and solvents.

Specially designed additives, such as grinding aids and/or dispersants are required for direct conversion of phthalocyanine blue pigment by media milling because the conversion includes not only the breaking of agglomerates to their primary particle size but also goes one step further. The phthalocyanine blue crude starts as a red shade crystal, but the milling breaks the crystal structure into the unstable "Y" α crystal and causes a lattice change to produce the green shade β crystal. A milling process (media size=0.25 mm) which induces a high amount of work and energy into the pigment dispersion is required to facilitate pigment crystal fracture, lattice structure shift and ultimately, pigment conversion. In addition to providing the properties of pigment wetting and stabilization, these additives also need to provide the grinding medium and composition with the proper rheology, viscosity and temperature stability due to the high energy nature of the process.

The salt grind process utilizes sodium chloride and glycols such ethylene glycol, diethylene glycol, or triethylene glycol, to break down the agglomerates and finally change crystal structure of β crude to the α form. The α crystal, however, is a red shade and it must be further reduced in particle size to the more thermodynamically stable β crystal via long grind times and high temperatures of >100° C. The "salt grind" process for conversion of crude phthalocyanine blue typically takes up to 24 hours and produces copious amounts of excess solvent and wastewater.

Thus, the traditional conversion of crude phthalocyanine blue by the salt grind process has the following drawbacks:

environmental concerns from wastewater created by the washing of salts and solvents
long processing times of up to 24 hr
many processing steps-once conversion is complete, it must be reprocessed into a sellable/usable form such as finished pigment dispersion U.S. Pat. No. 2,816,115 discloses converting a crude phthalocyanine coloring matter in β form to a pigmentary state without converting the coloring matter into the α form by milling it in an aqueous environment comprising a comminuted water-insoluble, solid grinding agent and a water soluble dispersing agent containing an anionic, water-soluble compound having relatively strong dispersing powers.

U.S. Pat. No. 3,593,927 discloses a process of comminution of an aqueous suspension of β copper phthalocyanine, by vigorous agitation in a grinding mill, with a particulate grinding aid, in the presence of an alkyl glycol ether having at least one ethylene glycol unit in the molecule and of one or more amine salts bearing at least one alkyl substituent having 12 or more carbon atoms in the chain.

U.S. Pat. No. 4,158,572 discloses a process for producing a phthalocyanine pigment comprising dry grinding a crude phthalocyanine, stirring the ground product with an aqueous medium containing a nonionic surfactant and isolating the pigmentary product, the preferred nonionic surfactant being ethoxylated alkyl phenols.

U.S. Pat. No. 4,427,810 discloses a method for producing an aqueous dispersion of phthalocyanine blue pigment comprising mixing in water a phthalocyanine crude pigment with a surfactant and grinding the mixture. Useful surfactants have an HLB value greater than 8 and include water-soluble, nonionic, cationic and anionic types.

GB 2,039,290 discloses converting crude copper phthalocyanine into an easily dispersible deeply colored pigmentary form without the use of organic solvents by dry milling the crude pigment in the absence of chemical milling assistants until the milled material consists of agglomerates which are composed of primary particles of <0.1 μm in size, followed by admixing the milled material with water and heating the mixture in the presence of at least 3 wt % surfactant but in the absence of shear forces effective to comminute the primary pigment particles, thereby recrystallizing the pigment, and isolating the recrystallized pigment. The milled material which is mixed with water is obtained by milling a mixture of crude copper phthalocyanine and 0.5 to 15 wt % acid which has a pK of <4.9 and is non-oxidizing under the milling conditions.

U.S. Pat. No. 5,852,179 discloses the use of alkoxylated acetylenic diol surfactants in aqueous synthesis of dispersed azo dyes to provide a simple process for improving the filtration properties of dyestuff. The surfactants may be added prior to the coupling steps of the synthesis or prior to heat treatment of the dye slurry. For azo dyes that are synthesized as non-heat-stable crystal modifications, the presence of alkoxylated acetylenic diol surfactants in the dye slurry is effective in promoting the conversion of the dye to the desired thermally stable crystal modification.

SUMMARY OF THE INVENTION

The present invention pertains to a process for converting crude phthalocyanine blue from red to green by milling an aqueous dispersion of the crude material and a surfactant grinding aid composition. The inventive process incorporates an acetylenic diol surfactant into the surfactant grind ing aid composition. Suitable acetylenic diol surfactants include those of the general formulas I and II:

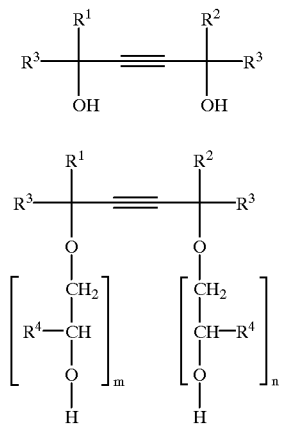

where $R^1$ and $R^2$, which may be the same or different, are C1–C8 alkyl, $R^3$ is hydrogen or methyl, $R^4$ is hydrogen, methyl, ethyl, or any combination thereof, and m+n=an average value from 1 to 100. Since alkoxylation of the acetylenic alcohol affords a distribution of alkoxy groups, m+n typically is reported as an average value. Acetylenic diol II is merely the alkoxylated product of diol I.

Incorporation of the acetylenic diol surfactants into a surfactant grinding aid composition in the milling process for converting phthalocyanine blue affords the following advantages compared to the salt grind process:

shorter processing times more environmentally friendly process—significantly reduces wastewater (washing of salts and solvents not required)

a finished, sellable product in the form of an aqueous dispersion easy further processing to other end uses such as presscake, dry toner/pigment or flush color.

Additional advantages of the present invention over the use of traditional grinding aids and surfactants are the following:

high temperature stability high viscosity stability (80° C.+)

high ph stability high cloud point and no saponification of resinous material improved hue, clarity, and gloss improved/complete conversion to later form.

DETAILED DESCRIPTION OF THE INVENTION

The crude beta-phthalocyanine pigment for use in the present invention can be prepared by any of the synthetic routes typically used in the art such as that disclosed in U.S. Pat. No. 5,859,237 which is incorporated by reference. Of the phthalocyanine pigments suited for use in the process, the metal phthalocyanine pigments are preferred, especially the copper phthalocyanine pigment.

There is provided a process for comminution and pigment conversion of an aqueous suspension of crude beta phthalocyanine by agitation, or grinding, in a grinding mill with a particulate grinding media such as sand or beads of porcelain, glass, or insoluble plastic material. The milling is performed with an aqueous suspension of the crude phthalocyanine pigment containing a surfactant grinding aid composition which comprises an acetylenic diol surfactant.

Suitable concentrations of the crude phthalocyanine suspended in water are known in the art, thus 10 to 50 parts by weight (pbw) of pigment, particularly 20 to 45 pbw, per 100 pbw of mill charge are suitable. Throughout this specification the mill charge means the total ingredients, excluding the particulate grinding elements, charged to the mill during the grinding process, and all proportions are given by weight, unless otherwise stated.

The particulate grinding elements used in the process of the invention may be of any hard nonpliable material which is insoluble in the aqueous medium used and may comprise sand, porcelain, glass, plastic, or metal. Preferably the particulate grinding aid is in the form of fairly uniform spheres about 0.5 mm or less in diameter.

Suitable means for milling are known in the art and may conveniently be carried out in a Zeta mill manufactured by Netzsch, Inc. As desired, the apparatus may be arranged to work continuously or discontinuously. When disc impellers are used in such an apparatus, they may advantageously rotate at a rate such that the peripheral speed of the discs is about 500–3,000 feet per minute.

It is preferred to use a mill containing 0.2–0.4 mm beads in order to achieve the adequate energy required to break down crude phthalocyanine agglomerates and initiate a change in crystal lattice structure from α to β form. Due to the high energy input in this conversion process, substantial heat is generated in the milling chamber. Therefore, the surfactant grinding aid composition must provide dynamic wetting and instantaneous pigment stabilization. In addition, the surfactant composition must be temperature stable in order to function properly in wetting and dispersing the crude phthalocyanine pigment without pasting up during the milling process. The surfactant grinding aid composition of the present invention provides for these attributes.

Completion of the process may readily be recognized by examining particle size of the pigment, which should be smaller than 1 micron. Particle sizes of the converted beta phthalocyanine pigment of less than 0.13 microns can be achieved on commercial milling equipment with milling times ranging from 3–6 hours.

After completion of the milling the particulate grinding aid may be removed by conventional means, for example by sieving and the aqueous pigment dispersion can be used as is or further treated by a homogenization step after which the pigment composition is filtered, washed, dried, and may be ground in a known manner until it is a free-flowing powder.

The surfactant grinding aid composition, which may be used at 0.5–8 wt %, preferably 1–6 wt %, of the aqueous pigment dispersion, or mill charge, comprises an acetylenic diol surfactant and, optionally, but preferably, one or more nonionic and/or anionic surfactants.

Suitable acetylenic diol surfactants include those of the general formulas I and II:

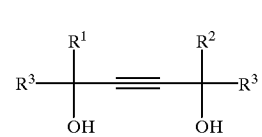

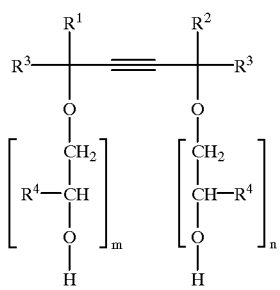

where $R^1$ and $R^2$, which may be the same or different, are C1–C8 alkyl, $R^3$ is hydrogen or methyl, $R^4$ is hydrogen, methyl, ethyl, or any combination thereof, and m+n=an average value from 1 to 100. With regard to the alkoxylated acetylenic diols of formula II it preferred that $R^1$ and $R^2$ are C1–C5, especially C4 (isobutyl), $R^3$ is hydrogen or methyl, $R^4$ is methyl and m+n=1 to 30. However, the preferred acetylenic diols for use in the surfactant grinding aid composition are materials of formula I in which $R^1$ and $R^2$ are C1–C5, especially C4 (isobutyl), and $R^3$ is methyl. Acetylenic diols of formulas I and II are marketed as SURFYNOL® surfactants by Air Products and Chemicals, Inc.

As stated, the surfactant grinding aid compositions, optionally, but preferably, contain one or more nonionic and/or anionic surfactants. Examples of suitable anionic surfactants for use in the process are half-esters of sulfuric acid with C6–C20 alkanols, 2-hydroxyalkanesulfonic acids of 8 to 20 carbon atoms, sulfuric acid half esters of C6–C20 alkylphenol polyalkoxylates, and C6–C20 alkylbenzenesulfonic acids, in the form of the alkali metal, ammonium, monoethanol-ammonium or diethanol ammonium salts; di(C6–C20 alkyl) sodium sulfosuccinates and salts of alkyl (unsubstituted or substituted) sulfosuccinamates in the form of alkali metal or ammonium salts. The sulfuric acid half esters of C6–C20 alkylphenol polyalkoxylates are adducts of ethylene oxides and/or propylene oxides in which 5–50 moles, preferably 20–40 moles, alkylene oxide are present. The preferred anionic surfactants are salts of sulfated alkylphenoxy poly(alkyleneoxy) alcohols, for example ammonium salt of sulfated nonylphenoxy poly(ethyleneoxy) ethanol and the alkyl sulfosuccinamates, for example, tetrasodium-N-(1,2-dicarboxyethyl)-N-octadecyl sulfosuccinamate.

Examples of suitable nonionic surfactants are amides, hydroxy-C2–C3-alkylamides and bis-(hydroxy-C2–C3-alkyl)-amides of C8–C20 fatty acids, C8–C20 alkanols, polyethylene oxide, polyalkylene oxides obtained from propylene oxide and ethylene oxide, adducts of ethylene oxides and/or propylene oxides with C8–C20 fatty acids, with C8–C20 fatty acid amides, with C8–C20 alkanols, with C6–C20 alkylphenols, with C8–C20 fatty acid ethanolamides, with C8–C20 fatty acid ethanolamine esters, with C8–C20 alkyl amines, with oleyl amine, with aliphatic diamines and polyamines, with cycloaliphatic monoamines and diamines, and with benzene-aromatic monoamines and diamines, or mixtures of the above. The preferred nonionic surfactants are the alkylphenoxy polyalkoxylates comprising adducts of ethylene oxides and/or propylene oxides in which 5–50 moles, preferably 20–40 moles, alkylene oxide are present.

The most preferred anionic surfactants are the sulfuric acid half esters of the C8–C12 alkyl phenol polyalkoxylates and the sulfosuccinamates and the most preferred nonionic surfactants are the C8–C12 alkylphenol polyalkoxylates.

The surfactant grinding aid composition may comprise the following active materials:

0–70 wt %, preferably 20–60 wt %, salt of sulfated alkylphenoxy polyalkoxylate;

0–70%, preferably 20–60 wt %, salt of alkyl sulfosuccinamate; and

5–100 wt %, preferably 5–35 wt %, acetylenic diol surfactant.

The preferred composition comprises

20–60 wt % salt of sulfated nonylphenoxy poly(ethyleneoxy) ethanol,

20–60 wt% tetrasodium N-(1,2-dicarboxy ethyl)-N-octadecyl sulfosuccinamate, and

5–35 wt % 2,4,7,9-tetramethyl-5-decyne-4,7-diol.

To prepare the surfactant grinding aid composition the acetylenic diol and the surfactants are simply blended. Since the preferred acetylenic diol, namely 2,4,7,9-tetramethyl-5-decyne-4,7-diol, is a solid at room temperature, it must be heated up to 50° C., but no greater than 60° C., before incorporation into the blend of the surfactants. The components should be mixed for approximately 15 minutes on a low, shear blender in order to ensure complete mixing.

In the following examples all the aqueous dispersions of the crude phthalocyanine blue were prepared using the following formulations containing a surfactant grinding aid composition and the mill procedure (pigment conversion process) unless otherwise stated.

| DISPERSION FORMULATION (pbw) | 1 | 2 |
|---|---|---|
| Crude Phthalocyanine Pigment | 40 | 40 |
| Water | 43.5 | 44.9 |
| Surfactant Grinding Aid Composition | 3.5 | 4.1 |
| AMP 95 | 1 | 1 |
| DEG | 12 | 10 |

MILLING PROCEDURE

Premix on Cowles Blade for 15 min

Horizontal shot mill (Eiger M100 or Netzsch Mini Zeta)

0.4 mm zirconium shot 50 to 75 vol % charge

Mill speed 4500 RPM

Milling temperature ~80° C.

Surfynol 104E surfactant added as needed to control foam

Make-up water was added to compensate for evaporation

Milling time varied according to abilities of grind aid

Table A shows the surfactant grind aid compositions used in the following examples, components in wt %: The wt % amounts in the table are based on active material (other than for the glycols and water).

TABLE A

| Grind Aid Composition | 1 | 2 | 3 | 4 | 5 | 6 | 7 |
|---|---|---|---|---|---|---|---|
| Aerosol NPES 3030P | 12 | 15 | 7.1 | 15 | 12 | 12 | — |
| Surfynol 104 | 10 | 8 | 7.6 | 10 | — | — | 8 |
| Aerosol 22 | 12.2 | — | — | — | 12.2 | 12.2 | 17.5 |
| Igepal W-730 | — | 27 | 25.6 | — | — | — | 27 |
| SMA 1440H | — | — | 7.9 | — | — | — | — |
| Disperbyk 190 | — | — | — | 20 | — | — | — |
| Emulgen HP-60 | — | — | — | — | 10 | — | — |

TABLE A-continued

| Grind Aid Composition | 1 | 2 | 3 | 4 | 5 | 6 | 7 |
|---|---|---|---|---|---|---|---|
| Ethylene Glycol | — | 11 | — | — | — | — | 11 |
| Diethylene Glycol | — | — | 5 | — | — | — | — |
| Water | 65.8 | 39 | 46.8 | 55 | 65.8 | 75.8 | 36.5 |

The following materials were used in the examples:
Crude phthalocyanine blue pigment from Phthalchem
AMP 95 aminomethyl propanol from Angus Chemicals
DEG—diethylene glycol
Aerosol NPES 3030P surfactant—ammonium salt of sulfated nonylphenoxy poly(ethyleneoxy) ethanol (30 moles EO) from Cytec Industries.
Surfynol 104 surfactant—tetramethyl decynediol from Air Products and Chemicals, Inc.
Surfynol 104E surfactant—50 wt % S-104 in ethylene glycol
Aerosol 22 surfactant—tetrasodium N-(1,2-dicarboxyethyl)-N-octadecyl sulfosuccinamate from Cytec Inds.
Igepal CO-730=Igepal W-730 nonylphenol ethoxylate (15 moles EO) from Rhodia
SMA 1440H surfactant is styrene maleic anhydride polymer from Elf Atochem
Disperbyk 190 polymeric dispersant from BYK Chemie
Emulgen HP-60 alcohol alkoxylate from High Point Chemical Percent conversion, or tinctorial strength, is conveniently measured by comparing the color of one pigment (the experimental batch), mixed with a specified amount of white base, with the color of another pigment (the standard) mixed with an equal amount of the same white base. In the following examples the conversion of crude phthalocyanine pigment was determined by color analysis comparing the experimental sample with a standard dispersion.

Procedure for Color Analysis

Standard Dispersion:
  40% salt ground converted phthalocyanine blue pigment
Color analysis:
1. Into a 50 ml container pour 25.00 g of bleach white (flat interior paint) and 0.50 g of dispersion
2. Mix until homogeneous and agitate on a paint shaker for 15 minutes.
3. On Leneta chart, make a draw down using a #20 wire wound rod.
4. Allow the draw down to dry over night.
5. Measure the color using a spectrophotometer.
6. The "a" value of the Standard Dispersion (STD) is taken to be 100%, Therefore, % conversion =(("a" value trial) / ("a" value STD))×100

EXAMPLE 1

Surfactant grind aid composition 1 was tested in the pigment conversion process using dispersion formulation 1 and was found to be very temperature stable, aided in the breakdown of agglomerates, was not foamy and remained fluid throughout the milling time of 6 hours. The maximum temperature was 85° C. This run attained >95% conversion compared to the standard salt ground product.

Table 1a shows the relative conversion versus standard salt grind dispersion.

TABLE 1a

| Time (min) | Temp (C.) | RPM | % Conversion |
|---|---|---|---|
| 0 | 22 | | |
| 30 | 67 | 4500 | 76.8 |
| 60 | 78 | 4500 | 84.9 |
| 90 | 78 | 4500 | 88.4 |
| 120 | 78 | 4500 | 89.7 |
| 150 | 80 | 4500 | 92.0 |
| 180 | 76 | 4500 | 92.5 |
| 210 | 77 | 4500 | 93.1 |
| 240 | 78 | 4500 | 93.3 |
| 270 | 79 | 4500 | 93.5 |
| 300 | 62 | 4500 | 95.7 |

The dispersion could be run at a high temperature (80° C.) with only modest viscosity increase noted. Mean particle size of final product was 0.164 μm.

TABLE 1b

| Time (min) | Temp (C.) | RPM | % Conversion |
|---|---|---|---|
| 0 | 22 | | |
| 30 | 66 | 4500 | 76.3 |
| 60 | 73 | 4500 | 83.6 |
| 90 | 77 | 4500 | 86.7 |
| 120 | 78 | 4500 | 89.6 |
| 150 | 79 | 4500 | 90.8 |
| 180 | 81 | 4500 | 92.0 |
| 210 | 80 | 4500 | 92.5 |
| 240 | 82 | 4500 | 92.4 |
| 270 | 82 | 4500 | 92.9 |
| 300 | 81 | 4500 | 95.0 |
| 330 | 83 | 4500 | 95.0 |
| 360 | 85 | 4500 | 95.5 |

When the run of Table 1b was stopped, the dispersion was fluid running at 80° C.

EXAMPLE 2

Surfactant grind aid composition 2 was run using dispersion formulation 1 for 3.4 hours. The particle size reduction as well as conversion attained with this grind aid composition plateaued. Composition 2, while an improvement over the prior art, did not provide as much conversion as grind aid composition 1.

TABLE 2a

| Time (min) | Temp (C.) | RPM | % Conversion |
|---|---|---|---|
| 0 | 22 | | |
| 30 | 70 | 4500 | 81.4 |
| 60 | 74 | 4500 | 86.8 |
| 90 | 76 | 4500 | 90.0 |
| 120 | 78 | 4500 | 91.6 |
| 150 | 76 | 4500 | 93.9 |
| 180 | 78 | 4500 | 95.0 |

The maximum temperature was 80° C. but could not be maintained due to excessive foaming. Temperature stability was not as good as grind aid composition 1. A conversion of 92.8% was attained.

TABLE 2b

| Time (min) | Temp (C.) | RPM | % Conversion |
|---|---|---|---|
| 0 | 22 | 4500 | |
| 30 | 66 | 4500 | 80.9 |
| 60 | 80 | 4500 | 87.6 |
| 75 | 80 | 4500 | |
| 90 | 65 | 4500 | 90.2 |
| 120 | 69 | 4500 | 91.6 |
| 150 | 69 | 4500 | 92.8 |

Severe foaming at 75 minutes. Mean particle size of final product 0.207 $\mu$m.

TABLE 2c

| Time (min) | Temp (C.) | RPM | % Conversion |
|---|---|---|---|
| 0 | 24 | — | |
| 30 | 69 | 4500 | 80.8 |
| 60 | 80 | 4500 | 86.8 |
| 90 | 81 | 4500 | 90.1 |
| 120 | 80 | 4500 | 91.4 |
| 150 | 80 | 4500 | 92.3 |
| 180 | 81 | 4500 | 94.0 |
| 210 | 80 | 4500 | 94.1 |
| 240 | 80 | 4500 | 95.1 |
| 270 | 80 | 4500 | 95.9 |
| 300 | 82 | 4500 | 96.1 |

After 300 minutes the dispersion was pasting up but still flowing.

EXAMPLE 3

Surfactant grinding aid composition 3 without an acetylenic diol surfactant was run using dispersion formulation 1 for 1.5 hours and pasted up. It was not temperature stable and therefore not viscosity stable. The maximum temperature was 75° C. A conversion of 91.3% was attained.

TABLE 3

| Time (min) | Temp (C.) | RPM | % Conversion |
|---|---|---|---|
| 0 | 22 | 4500 | |
| 30 | 48 | 4500 | 80.4 |
| 60 | 46 | 4500 | 86.3 |
| 90 | 61 | 4500 | 89.1 |
| 120 | 65 | 4500 | 90.3 |
| 150 | 75 | 4500 | 91.3 |

Mean particle size of final product 0.207 $\mu$m.

EXAMPLE 4

Surfactant grind aid composition 4 was run in the conversion process using dispersion formulation 2 for 2.5 hours. The aqueous dispersion was too foamy (believed due to the Disperbyk 190 surfactant) to produce an efficient grind and thus gave poor color development. The milling speed was reduced to 3500 RPM to stop air entrainment. Additionally 5 drops of Surfynol 104E surfactant were added to try to control foam. The maximum temperature was 72° C. 89.2% conversion was attained.

TABLE 4

| Time (min) | Temp (C.) | RPM | % Conversion |
|---|---|---|---|
| 0 | 24 | 3500 | |
| 30 | 38 | 3500 | 73.4 |
| 60 | 40 | 3500 | 81.7 |
| 90 | 53 | 3500 | 85.1 |
| 120 | 60 | 3500 | 87.4 |
| 150 | 72 | 3500 | 89.2 |

EXAMPLE 5

Surfactant grinding composition 5, which did not contain an acetylenic diol, was run in dispersion formulation 1 for 3.25 hours and pasted up in run 5a and thickened up (ready to paste up) in run 5b. The maximum temperature was 83° C. A conversion of 93.6% was attained.

TABLE 5a

| Time (min) | Temp (C.) | RPM | % Conversion |
|---|---|---|---|
| 0 | 21 | — | |
| 30 | 65 | 4500 | 77.1 |
| 60 | 77 | 4500 | 85.1 |
| 90 | 81 | 4500 | 89.6 |
| 120 | 80 | 4500 | 91.1 |
| 150 | 83 | 4500 | 92.6 |
| 180 | 80 | 4500 | 93.2 |
| 195 | 80 | 4500 | 93.6 |

TABLE 5b

| Time (min) | Temp (C.) | RPM | % Conversion |
|---|---|---|---|
| 0 | 22 | 4500 | |
| 30 | 66 | 4500 | 76.0 |
| 60 | 79 | 4500 | 84.4 |
| 90 | 80 | 4500 | 89.0 |
| 120 | 82 | 4500 | 91.0 |
| 150 | 80 | 4500 | 92.6 |
| 160 | 80 | 4500 | |

Mean particle size was 0.179 $\mu$m

EXAMPLE 6

Surfactant grinding composition 6 in dispersion formulation 1 was run for 2.5 hours. It produced a very thick paste that was hard to work with and grind. The maximum temperature was 80° C. A conversion of 90.1% was attained.

TABLE 6

| Time (min) | Temp (C.) | RPM | % Conversion |
|---|---|---|---|
| 0 | 22 | 4500 | |
| 30 | 55 | 4500 | 75.6 |
| 60 | 76 | 4500 | 83.0 |
| 90 | 81 | 4500 | 86.8 |
| 120 | 81 | 4500 | 88.9 |
| 150 | 80 | 4500 | 90.1 |

Mean particle size was 0.198 $\mu$m

EXAMPLE 7

Surfactant package 7 was tested with the following conditions 40 percent pigment and 10 percent surfactant package (25% on pigment solids). The milling procedures were as follows:

| | |
|---|---|
| Mill: | LM05 (Netzsch Grinding Equipment) |
| Media: | 0.25 mm steel |
| Media Charge: | 90% |
| Agitator Speed (RPM): | 2900 |
| Temperature (° C.): | 40 |
| Time (min): | 80 |

A sample after 80 min yielded an average particle size of 0.178 mm and essentially minimal conversion.

From the results of Examples 1–7 it can be seen that grind aid composition 1 was optimal for achieving the highest conversion. Omitting the acetylenic diol component of the grind aid composition results in poor viscosity stability of the dispersion and, ultimately, poor conversion. The proper ratios of tetrasodium-N-(1,2-dicarboxyethyl)-N-octadecyl sulfosuccinamate and salt of sulfated nonylphenoxy poly(ethyleneoxy) ethanol aids in the temperature and viscosity control of the dispersion during the conversion process of red to green shade. Ultimately the proper particle size reduction can be achieved with grind aid composition 1 leading to a high degree of conversion, i.e., >95% versus salt ground dispersion.

STATEMENT OF INDUSTRIAL APPLICATION

The invention provides a surfactant grind aid composition for use in converting an aqueous dispersion of crude phthalocyanine blue pigment from red to green.

What is claimed is:

1. In a method for converting crude phthalocyanine blue pigment from red to green by milling a dispersion of the crude phthalocyanine pigment in an aqueous medium containing a particulate grinding aid and a surfactant grinding aid composition, the improvement which comprises employing a surfactant grinding aid composition comprising an acetylenic diol surfactant.

2. The method of claim 1 in which the acetylenic diol is a surfactant of the structure

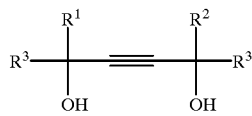

where $R^1$ and $R^2$, which may be the same or different, are C1–C8 alkyl and $R^3$ is hydrogen or methyl.

3. The method of claim 1 in which the surfactant grinding aid composition is 2–20 wt % of the aqueous pigment dispersion.

4. The method of claim 2 in which $R^1$ and $R^2$, which may be the same or different, are C1–C5 alkyl and $R^3$ is methyl.

5. The method of claim 1 in which the surfactant grinding aid composition comprises 0–70 wt % salt of sulfated alkylphenoxy polyalkoxylate;
0–70% sulfosuccinamate; and
5–100 wt % acetylenic diol surfactant.

6. The method of claim 1 in which the surfactant grinding aid composition comprises 20–60 wt % salt of sulfated alkylphenoxy polyalkoxylate;
20–60 wt %, sulfosuccinamate; and
5–35 wt % acetylenic diol surfactant.

7. The method of claim 1 in which the surfactant grinding aid composition also comprises an anionic surfactant selected from the group consisting of half-esters of sulfuric acid with C6–C20 alkanols, 2-hydroxyalkanesulfonic acids of 8 to 20 carbon atoms, sulfuric acid half esters of C6–C20 alkylphenol polyalkoxylates, and C6–C20 alkylbenzenesulfonic acids, all the acids being in the form of the alkali metal, ammonium, monoethanol-ammonium or diethanol ammonium salts; di(C6–C20 alkyl) sodium sulfosuccinates, sulfosuccinamates, and mixtures of all the foregoing.

8. The method of claim 1 in which the surfactant grinding aid composition also comprises a nonionic surfactant selected from the group consisting of amides, hydroxy-C2–C3-alkylamides and bis-(hydroxy-C2–C3-alkyl)-amides of C8–C20 fatty acids, C8–C20 alkanols, polyethylene oxide, polyalkylene oxides obtained from propylene oxide and ethylene oxide, adducts of ethylene oxides and/or propylene oxides with C8–C20 fatty acids, with C8–C20 fatty acid amides, with C8–C20 alkanols, with C6–C20 alkylphenols, with C8–C20 fatty acid ethanolamides, with C8–C20 fatty acid ethanolamine esters, with C8–C20 alkyl amines, with oleyl amine, with aliphatic diamines and polyamines, with cycloaliphatic monoamines and diamines, and with benzene-aromatic monoamines and diamines, and mixtures thereof.

9. The method of claim 1 in which the surfactant grinding aid composition also comprises an anionic surfactant selected from the group consisting of sulfuric acid half esters of C6–C20 alkylphenol polyalkoxylates, sulfosuccinamates, and mixtures thereof.

10. The method of claim 9 in which the surfactant grinding aid composition also comprises a nonionic surfactant which is a C8–C12 alkylphenol polyalkoxylate.

11. The method of claim 1 in which the acetylenic diol surfactant is 2,4,7,9-tetramethyl-5-decyne-4,7-diol.

12. In a method for comminution of crude beta phthalocyanine pigment to convert the phthalocyanine from red to green which comprises grinding with a particulate grinding aid an aqueous suspension of the crude phthalocyanine pigment and a surfactant grinding aid composition, the improvement in which the surfactant grinding aid composition comprises an acetylenic diol surfactant.

13. The method of claim 12 in which the acetylenic diol is a surfactant of the structure

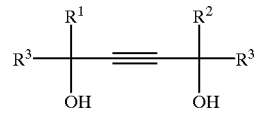

where $R^1$ and $R^2$, which may be the same or different, are C1–C8 alkyl and $R^3$ is hydrogen or methyl.

14. The method of claim 13 in which the surfactant grinding aid composition is 2–20 wt % of the aqueous pigment suspension.

15. The method of claim 14 in which $R^1$ and $R^2$, which may be the same or different, are C1–C5 alkyl and $R^3$ is methyl.

16. The method of claim 15 in which the surfactant grinding aid composition comprises 0–70 wt % salt of sulfated alkylphenoxy polyalkoxylate;
0–70% sulfosuccinamate; and
5–100 wt % acetylenic diol surfactant.

17. The method of claim 15 in which the surfactant grinding aid composition comprises 20–60 wt % salt of sulfated alkylphenoxy polyalkoxylate;
20–60 wt %, sulfosuccinamate; and
5–35 wt % acetylenic diol surfactant.

18. The method of claim 15 in which the surfactant grinding aid composition also comprises an anionic surfactant selected from the group consisting of half-esters of sulfuric acid with C6–C20 alkanols, 2-hydroxyalkanesulfonic acids of 8 to 20 carbon atoms, sulfuric acid half esters of C6–C20 alkylphenol polyalkoxylates, and C6–C20 alkylbenzenesulfonic acids, all the acids being in the form of the alkali metal, ammonium, monoethanol-ammonium or diethanol ammonium salts; di(C6–C20 alkyl) sodium sulfosuccinates, sulfosuccinamates, and mixtures of all the foregoing.

19. The method of claim 15 in which the surfactant grinding aid composition also comprises a nonionic surfactant selected from the group consisting of amides, hydroxy-C2–C3-alkylamides and bis-(hydroxy-C2–C3-alkyl)-amides of C8–C20 fatty acids, C8–C20 alkanols, polyethylene oxide, polyalkylene oxides obtained from propylene oxide and ethylene oxide, adducts of ethylene oxides and/or propylene oxides with C8–C20 fatty acids, with C8–C20 fatty acid amides, with C8–C20 alkanols, with C6–C20 alkylphenols, with C8–C20 fatty acid ethanolamides, with C8–C20 fatty acid ethanolamine esters, with C8–C20 alkyl amines, with oleyl amine, with aliphatic diamines and polyamines, with cycloaliphatic monoamines and diamines, and with benzene-aromatic monoamines and diamines, and mixtures thereof.

20. The method of claim 15 in which the surfactant grinding aid composition also comprises an anionic surfactant selected from the group consisting of sulfuric acid half esters of C6–C20 alkylphenol polyalkoxylates, sulfosuccinamates, and mixtures thereof.

21. The method of claim 15 in which the surfactant grinding aid composition also comprises a nonionic surfactant which is a C8–C12 alkylphenol polyalkoxylate.

22. The method of claim 12 in which the acetylenic diol surfactant is 2,4,7,9-tetramethyl-5-decyne-4,7-diol.

* * * * *